United States Patent
Clodic (10) Patent No.: US 12,181,190 B2
(45) Date of Patent: Dec. 31, 2024

(54) METHOD AND DEVICE FOR PROVIDING SUB-COOLING OF REFRIGERANTS

(71) Applicant: CRYO PUR, Massy (FR)

(72) Inventor: Denis Clodic, Massy (FR)

(73) Assignee: CRYO PUR, Massy (FR)

( * ) Notice: Subject to any disclaimer, the term of this patent is extended or adjusted under 35 U.S.C. 154(b) by 207 days.

(21) Appl. No.: 17/799,818

(22) PCT Filed: Feb. 19, 2021

(86) PCT No.: PCT/EP2021/054186
§ 371 (c)(1),
(2) Date: Aug. 15, 2022

(87) PCT Pub. No.: WO2021/165482
PCT Pub. Date: Aug. 26, 2021

(65) Prior Publication Data
US 2023/0107572 A1    Apr. 6, 2023

(30) Foreign Application Priority Data
Feb. 20, 2020  (EP) .................................... 20158502

(51) Int. Cl.
*F25B 40/02*    (2006.01)
*F25B 41/20*    (2021.01)
*F25B 49/02*    (2006.01)

(52) U.S. Cl.
CPC .............. *F25B 40/02* (2013.01); *F25B 41/20* (2021.01); *F25B 49/027* (2013.01);
(Continued)

(58) Field of Classification Search
CPC ........ F25B 40/02; F25B 41/20; F25B 49/027; F25B 2339/047; F25B 2400/0415;
(Continued)

(56) References Cited

U.S. PATENT DOCUMENTS

| | | | | |
|---|---|---|---|---|
| 4,831,835 A | * | 5/1989 | Beehler | F25B 49/027 62/509 |
| 2015/0362199 A1 | * | 12/2015 | Yumoto | F25B 13/00 62/228.1 |
| 2016/0377532 A1 | * | 12/2016 | Dainobu | G01N 33/497 250/339.12 |

FOREIGN PATENT DOCUMENTS

EP      2 921 326 A2     9/2015
EP      2921326 B1  * 10/2017   ......... B60H 1/00885
(Continued)

OTHER PUBLICATIONS

Gonzalez, Vehicle air conditioning system comprising a coolant circuit, 2014, Full Document (Year: 2014).*
(Continued)

*Primary Examiner* — Nael N Babaa
(74) *Attorney, Agent, or Firm* — Sughrue Mion, PLLC (57) ABSTRACT

A dynamic method of maintaining a predefined sub-cooling of a refrigerant exiting a condenser by dynamic control of the circulating mass of refrigerant, by transferring the refrigerant into or towards a receiver installed in parallel with the liquid connection between the condenser and the expansion valve, as a function of the difference in temperatures between the condensation temperature of the saturation liquid and the discharge temperature from the condenser.

8 Claims, 4 Drawing Sheets

(52) U.S. Cl.
CPC . *F25B 2339/047* (2013.01); *F25B 2400/0415* (2013.01); *F25B 2400/16* (2013.01); *F25B 2500/222* (2013.01); *F25B 2600/2515* (2013.01); *F25B 2700/1931* (2013.01); *F25B 2700/197* (2013.01); *F25B 2700/21161* (2013.01); *F25B 2700/21172* (2013.01); *F25B 2700/21173* (2013.01); *F25B 2700/21175* (2013.01)

(58) Field of Classification Search
CPC .............. F25B 2400/16; F25B 2500/16; F25B 2500/222; F25B 2600/2515; F25B 2700/1931; F25B 2700/197; F25B 2700/21161; F25B 2700/21172; F25B 2700/21173; F25B 2700/21175

See application file for complete search history.

(56) References Cited

FOREIGN PATENT DOCUMENTS

| | | |
|---|---|---|
| EP | 3 361 184 A1 | 8/2018 |
| GB | 2461029 A | 12/2009 |
| JP | 2008249234 A * | 10/2008 |
| KR | 101989753 B1 * | 11/2018 |
| WO | 2013/119489 A2 | 8/2013 |

OTHER PUBLICATIONS

Ihayazaka, Failure diagnosing device . . . 2007, Full Document (Year: 2007).*
Kim, Condtioner heat recycling heat pump system . . . 2018, Full Document (Year: 2018).*
International Search Report for PCT/EP2021/054186 dated, May 10, 2021 (PCT/ISA/210).

* cited by examiner

METHOD AND DEVICE FOR PROVIDING SUB-COOLING OF REFRIGERANTS

CROSS REFERENCE TO RELATED APPLICATIONS

This application is a National Stage of International Application No. PCT/EP2021/054186 filed Feb. 19, 2021, claiming priority based on European Patent Application No. 20158502.3 filed Feb. 20, 2020.

TECHNICAL FIELD

The invention relates to a method and a device for providing sub-cooling of refrigerants.

STATE OF THE ART

State-of-the-art vapor compression systems designed for producing cooling or heat pumping, comprise four generic components: two exchangers, a condenser and an evaporator, a compressor and an expansion valve.

A vapor compression cycle takes place with a liquid-vapor phase-change fluid called refrigerant, which is chosen based on evaporation and condensation temperature levels.

The fluid is completely evaporated in the evaporator at the low pressure of the system, after expansion through the expansion valve.

The refrigerant in vapor phase is compressed by the compressor at the high pressure of the system, is then condensed in the condenser at that high-pressure, and must be completely liquid at the discharge of said condenser.

The generic operational constraint is that the expansion valve accepts only a fluid in liquid phase. Gas bubbles in the liquid cause malfunctions of the expansion valve, which may cause blockage of the flow.

The refrigerant therefore must be sub-cooled upstream from the expansion valve, i.e., the temperature at the discharge of the condenser must be lower than the condensation saturation temperature.

The sub-cooling is provided by the condenser, about 10% of the volume of the condenser conventionally providing this sub-cooling. This 10% of the volume of the condenser is located in the lower part thereof.

The actual operation of the vapor compression system is at a variable rate, based on the cooling or heating power required and depending on the season for the conditions of heat rejection into the environment. The refrigerant flow rate varies between the minimum and the maximum by a factor of 2 to 5.

The mass of refrigerant charged in the system must match the maximum flow rate, otherwise the supply of the expansion valve would be insufficient.

The system is therefore overcharged with refrigerant when the flow rate is clearly less than the maximum flow rate.

The practical consequence is that this excess mass must be stored by inserting a volume into the high pressure of the system.

This volume is a receiver, either arranged in series downstream from the condenser, or incorporated into the condenser.

It should be noted that to avoid recharging the system too quickly, in order to compensate for small leaks of refrigerant, manufacturers charge the system at least 10% to 30% beyond the charge necessary for operation at maximum flow rate.

To summarize, refrigerant must be stored in the high-pressure part of the system in a receiver incorporated in the connection between the condenser and the expansion valve.

This store of refrigerant at high pressure must be sub-cooled up to upstream of the expansion valve, which is not always the case, far from it.

For a long time, the state of the art has produced numerous patents for providing sub-cooling of refrigerant, with very different solutions.

WO2014/035134 (Korea Energy) proposes providing the sub-cooling by change of volume of the receiver.

U.S. Pat. No. 6,378,323 (Carrier) proposes inserting an additional exchanger inside the high-pressure receiver, in order to maintain the sub-cooling.

U.S. Pat. No. 6,170,272 (Systematic refrigeration) proposes the sub-cooling of the high-pressure refrigerant by an additional refrigeration system, specifically dedicated to sub-cooling.

U.S. Pat. No. 4,862,702 (Neal) proposes controlling the high pressure on the high-pressure receiver by regulating an injection of high-pressure vapor into the receiver in order to avoid the pressure upstream from the expansion valve from becoming too low and to ensure the sub-cooling.

OBJECTS OF THE INVENTION

A first object of the invention is to propose a device and a method for providing satisfactory sub-cooling of a refrigerant in a refrigeration system, making it possible to eliminate the risk of the presence of gas bubbles in the refrigerant, which gas bubbles can cause malfunctions of the expansion valve which may cause blockage of the flow.

Another object of the invention is to propose a method and a device for providing satisfactory sub-cooling of a refrigerant, in a refrigeration system, and enabling the circulating mass of refrigerant to adapt to the variations in flow of the refrigerant, in a vapor compression system.

General Description of the Invention

To those ends, firstly, a refrigeration system is proposed comprising a compressor, a condenser, an expansion valve, an evaporator and a receiver of a refrigerant, the compressor providing the circulation of a refrigerant, the condenser being cooled by a cooling medium circulating in a heat sink circuit, the evaporator cooling the medium of a source circuit, a liquid refrigerant line connecting the condenser to the expansion valve, the evaporator being placed downstream from the expansion valve and upstream from the compressor, the refrigeration system providing a transfer of heat from the medium to be cooled circulating in the source circuit from the evaporator to the cooling heat sink circuit of the condenser, the receiver being advantageously installed in a line connected in parallel with the liquid refrigerant line that directly connects the condenser to the expansion valve.

Advantageously, the receiver is connected to the liquid refrigerant line by two conduits, a first conduit being provided with a valve enabling the discharge of the refrigerant to the receiver, and a second conduit being provided with a valve enabling the discharge of the refrigerant to the expansion valve.

Advantageously, the refrigeration system comprises measurers, connected to monitoring and control means, said measurers comprising a temperature gauge in the source circuit upstream from the evaporator, a temperature gauge in the source circuit downstream from the evaporator, a pressure gauge in the refrigerant circuit connecting the expansion valve and the evaporator, a pressure gauge in the refrigerant circuit connecting the compressor and the condenser, and a temperature gauge in the heat sink circuit downstream from the condenser.

Advantageously, the refrigeration system comprises measurers connected to monitoring and control means, said measurers comprising a temperature gauge in the refrigerant circuit connecting the evaporator and the compressor.

Advantageously, the opening of the valve allowing the discharge of the refrigerant to the receiver and of the valve allowing the discharge of the refrigerant to the expansion valve is controlled by the monitoring and control means.

According to various implementations, the refrigerant comprises ammonia, a hydrocarbon, a fluorinated fluid, or a mixture of refrigerants.

According to a second aspect, a method of operation is proposed for a refrigeration system as presented above, comprising maintaining a predefined sub-cooling of a refrigerant exiting a condenser by dynamic control of the circulating mass of refrigerant, by transferring the refrigerant into or towards a receiver installed in parallel with the liquid connection between the condenser and the expansion valve, as a function of the difference in temperatures between the condensation temperature of the saturation liquid and the discharge temperature from the condenser.

Advantageously, the saturated condensation temperature of the liquid is calculated by the monitoring electronics of the refrigeration system which has in memory thermodynamic properties of the refrigerant charge to the refrigeration system.

Advantageously, the gaseous phase of the fluid contained in the receiver is connected to the highest pressure of the refrigeration system, upstream from the condenser.

The measurement of the sub-cooling and the adjustment of the circulating mass of refrigerant make it possible to maintain a slightly variable level of refrigerant in the lower part of the condenser.

The connection between the condenser and the expansion valve is advantageously always in liquid phase.

In some embodiments, the method comprises a step allowing the diagnosis of refrigerant leak from the refrigeration system, by comparing intake and discharge temperatures of the cooled fluid in the evaporator.

DESCRIPTION OF EMBODIMENTS

Other objects and advantages of the invention will be seen in the light, on the one hand, of the description of the physical reason for which the devices of the prior art, in which a receiver is placed in series between the condenser and the expansion valve, limit the sub-cooling, and on the other hand, of the description of one embodiment with reference to the appended drawings.

Figure 1A:
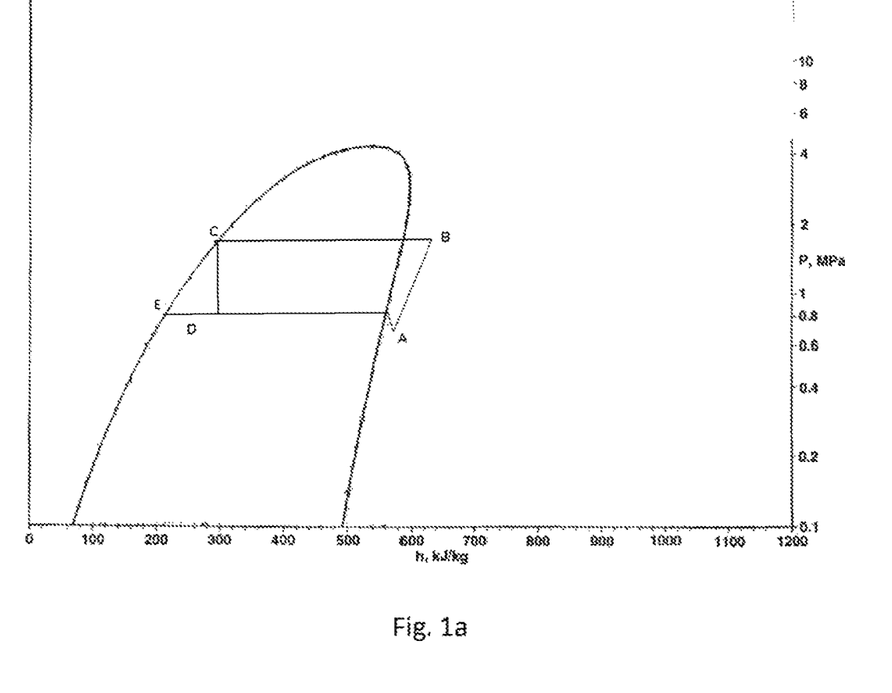
FIG. 1a depicts a vapor compression cycle of a refrigerant in a mass pressure-enthalpy diagram, the pressure being on a logarithmic scale on the vertical axis and the mass enthalpy on the horizontal axis.
Figure 1B:
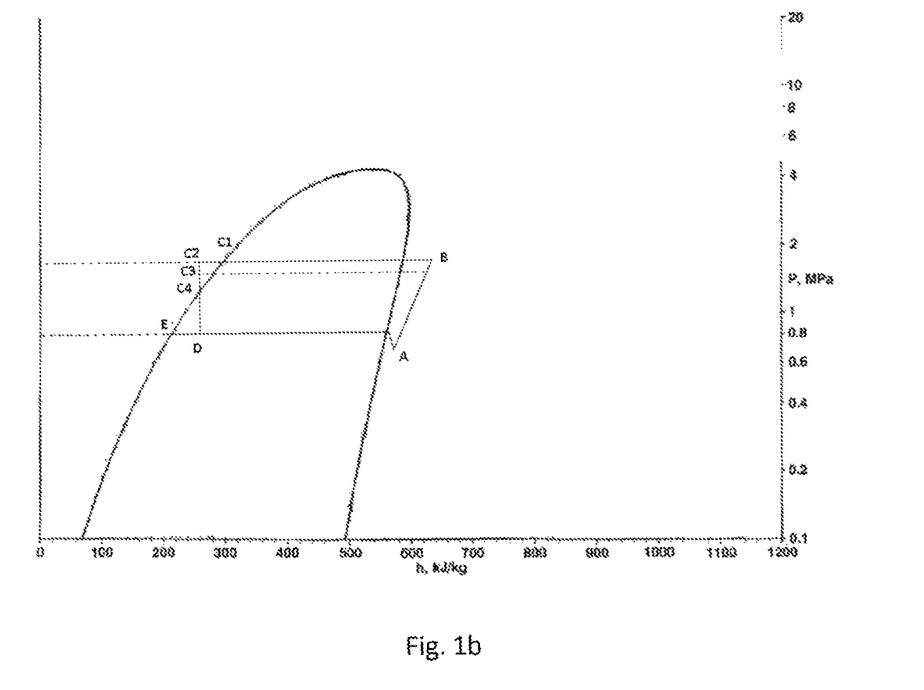
FIG. 1b is a view similar to FIG. 1a, the sub-cooling of the refrigerant being represented by the segment C1C2.
Figure 1C:
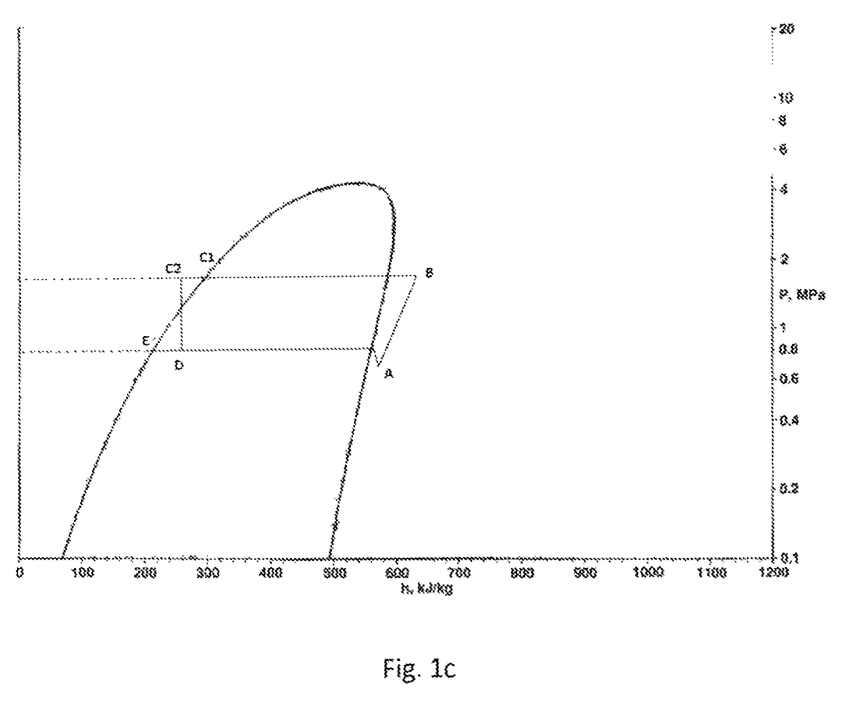
FIG. 1c is a view similar to FIG. 1a, the refrigerant at condensation pressure leaving the condenser sub-cooled at point C2, and entering a receiver installed in series in the liquid line that connects the condenser to the expansion valve, according to the state-of-the-art.

Reference is made first to FIGS. 1a, 1b and 1c, for a description of the physical reason for which the devices of the prior art, comprising a receiver placed in series between a condenser and an expansion valve, limit the sub-cooling.

FIG. 1a depicts a vapor compression cycle of a refrigerant in a mass pressure-enthalpy diagram.

In FIG. 1a, the change AB corresponds to the compression of the refrigerant, the change BC to the condensation of the refrigerant, the change CD to the expansion of the refrigerant and the change DA to the evaporation of the refrigerant, which completes the cycle.

In FIG. 1a, the pressure is in MPa and in logarithmic scale on the vertical axis, the mass enthalpy in kJ/kg on the horizontal axis.

FIG. 1a is a theoretical representation, because point C is exactly on the saturation curve at the point where the last vapor bubble is condensed.

The slightest loss of pressure and the connection between the condenser and the expansion valve causes the formation of bubbles; the refrigerant must therefore be sub-cooled before it leaves the condenser.

This sub-cooling is represented in FIG. 1b by segment C1C2.

In FIG. 1b, point C3 represents the state of the refrigerant still sub-cooled, but at a lower pressure due to the losses of charge in the connection between the condenser and the expansion valve.

Point C4 represents the acceptable pressure limit for losses of charge, because the sub-cooling is then zero.

What usually is not understood is the phenomenon depicted in FIG. 1c: the refrigerant at condensation pressure leaves the condenser sub-cooled at point C2, and enters a receiver installed in series in the liquid line that connects the condenser to the expansion valve, according to the state-of-the-art.

The receiver is always designed partially full, for safety reasons, and therefore has a liquid-vapor interface.

The phenomenon that occurs is related to the physical fact that the sub-cooling is a non-equilibrium condition, which is only ensured in a completely liquid volume.

At the liquid-vapor interface, the refrigerant can only be saturating.

The result is that the sub-cooled fluid entering the receiver generates the vapor therein, in order to recover the saturation pressure at the liquid-vapor interface.

In FIG. 1c, the vapor produced corresponds to the passage from C2 to C1.

This vapor production is done in the mass of liquid with entrainment of bubbles in the connection piping between the receiver and the expansion valve.

The only sub-cooling possible is related to the static pressure corresponding to the geometric height of the refrigerant, which is only sufficient for vertical receivers that are well filled.

This height of refrigerant generally ensures a sub-cooling of 1° C. to 2° C., which is relatively low.

This phenomenon of re-boiling of the sub-cooled fluid is poorly understood and is usually attributed to losses of charge.

The invention makes it possible to avoid these disadvantages.

Therefore, according to one aspect of the invention, a method is proposed that consists in controlling the circulating mass of refrigerant by making the refrigerant enter or exit a receiver installed in parallel with the liquid refrigerant line that connects the condenser to the expansion valve.

The receiver is connected to this line by two valves, one allowing the discharge of the fluid from the circuit to the receiver, the other allowing the recharge of the circuit by the refrigerant contained in the receiver.

Advantageously, these valves remain closed except for short periods of adjustment of the refrigerant charge in the circuit.

This arrangement of the receiver in parallel, with fluid transfer, ensures a continuous sub-cooling, because the outlet of the condenser is directly connected to the intake of the expansion valve and the line connecting the condenser and the expansion valve is advantageously completely full of liquid, irrespective of the flow rate.

This control of the sub-cooling is dynamic, because it is carried out by adjusting the circulating mass of refrigerant to the required cooling power.

The greater this cooling or heating power, the proportionally higher the flow of refrigerant, and the greater the circulating mass in the circuit must be as well, in order for the bottom of the condenser and the liquid line to be completely full of liquid refrigerant.

These arrangements make it possible to avoid the appearance of gas bubbles, and make it possible to avoid the creation of a two-phase flow in the liquid line.

The method according to the invention makes it possible to determine the required charge of refrigerant in the circuit, according to the different operating conditions, namely according to the cooling power or heating power required, and the variable temperature conditions at the condenser.

Advantageously, the sub-cooling conditions are still ensured by the complete filling with liquid of the condenser and expansion valve connection, which depends, according to the method of control, on two parameters: the condensation pressure and the percentage of opening of the expansion valve.

In order for these two parameters to be able to determine the mass of refrigerant in circulation, several additional conditions are advantageously taken into account.

Figure 2:
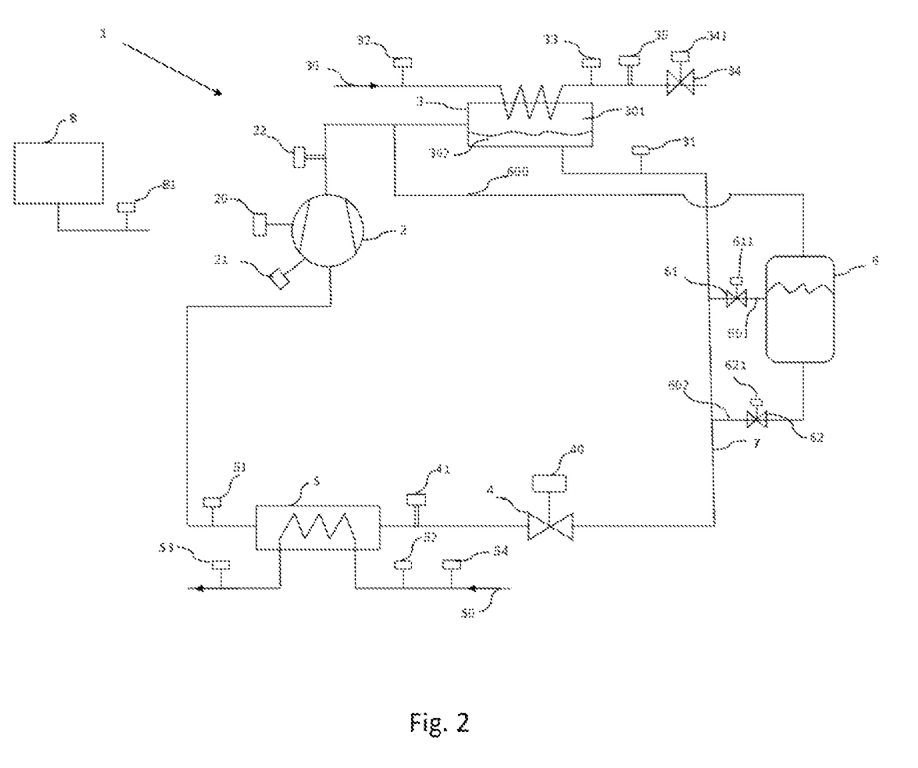
FIG. 2 depicts a refrigeration system according to one embodiment of the invention.

FIG. 2 depicts one embodiment of a refrigeration system according to the invention.

The refrigeration system represented in FIG. 2 provides the dynamic sub-cooling of a refrigerant by adapting the circulating mass of refrigerant to the variations in flow rate of the refrigerant.

In the embodiment of FIG. 2, the device 1 is a vapor compression system.

The device 1 comprises a compressor 2, equipped with a power controller 20, a power meter 21 and a pressure gauge 22 arranged at the discharge of the compressor 2 measuring the high pressure of the device 1, which is the condensation pressure.

The device 1 comprises a condenser 3, cooled by a cooling medium circulating in a circuit 30 called a heat sink circuit in the following description.

The cooling flow is measured by a flowmeter 35.

A regulator valve 34 can modulate the flow of the cooling medium.

The intake and discharge temperatures of the cooling medium are measured respectively by the temperature gauges 32, 33.

The temperature of the refrigerant is measured at the discharge of the condenser 3, by a temperature gauge 31.

Two internal volumes are distinguished within the condenser 3: the two-phase liquid-vapor volume 301 and the purely liquid volume 302.

The purely liquid volume 302 typically occupies from 2% to 10% of the total internal volume of the condenser 3.

The device 1 comprises an expansion valve 4, with its control electronics 40, incorporating the measurement of the low-pressure by a pressure gauge 41.

The device 1 comprises an evaporator 5, cooling the medium of a circuit 50, called source circuit in the remainder of this description.

The flow rate of this medium to be cooled is measured by a flowmeter 54.

The intake and discharge temperatures of the medium to be cooled are measured respectively by the temperature gauges 52, 53.

The temperature of the refrigerant at the discharge of the evaporator 5 is measured by a gauge 51.

The device 1 comprises a liquid line 7 with direct connection between the condenser 3 and the expansion valve 4.

The device 1 comprises, in parallel with this liquid line 7, a refrigerant receiver 6, continually maintained at high pressure upstream from the condenser 3 by a capillary 600.

This receiver 6 is connected to the liquid line 7 by two lines 601, 602, respectively equipped with regulator valves 61, 62 with their respective actuators 611, 621.

These regulator valves 61, 62 are normally closed.

The device 1 comprises monitoring and control electronics 8 of the refrigeration system, which incorporates all the measurements, and which has thermodynamic data from the refrigerant, in particular making it possible to automatically calculate the saturation temperature 81 of the saturating liquid, based on the condensation pressure measured by the pressure gauge 22.

It should be noted that the refrigerant may also be a pure substance such as ammonia, a hydrocarbon such as propane, a fluorinated fluid such as R-1234ze or a mixture of refrigerants where the liquid and vapor saturation temperatures are different.

The refrigerant is placed in circulation by the compressor 2, resulting in a net thermal transfer of the heat from the medium to be cooled circulating in the source circuit 50 of the evaporator 5 towards the cooling heat sink circuit 30 of the condenser 3.

The rejected thermal power in the cooling circuit 30 is the sum of the thermal power extracted from the evaporator 5, called cooling capacity, with the addition of the thermal power transmitted to the fluid by the compressor 2.

Refrigeration systems operate at variable powers, at the evaporator 5 (because the cooling needs of the source circuit 50 may vary greatly), as well as at the compressor 2, because the compression power depends directly on the difference in temperatures and therefore the difference in pressures between the evaporator 5 and the condenser 3.

When this difference varies, the powers vary simultaneously.

Two operating situations of the refrigeration system 1 depicted in FIG. 2 will now be presented.

The first situation is that of an increase in demand for cooling in the source circuit 50.

This increase manifests itself by a temperature at the intake of the evaporator 5 in the source circuit 50, measured by the temperature gauge 52, that is higher than in the previous time-step.

The cooling capacity provided by the system 1 is unchanged.

Consequently, the temperature measured by the gauge 53 in the source circuit 50 at the discharge of the evaporator 5 rises.

This parameter is processed by the electronics of the power controller 20 of the compressor 2, which increases the suction flow rate of refrigerant, either by increasing the speed of rotation of the compressor 2, or by bringing online an additional compressor for a multi-compressor refrigeration system.

The flow rate of refrigerant sucked by the compressor 2 is increased.

The evaporation pressure measured by the pressure gauge 41 decreases.

The control electronics 40 of the expansion valve 4 receiving this signal cause the passage opening of the expansion valve 4 to open wider.

The liquid flow at the intake of the expansion valve 4 therefore increases, which results in lowering the level of the purely liquid volume 302 in the condenser 3.

The reduction of the purely liquid volume 302 in the condenser 3 reduces the thermal exchange dedicated to the sub-cooling, since the exchange surface associated with the volume is reduced, which causes the difference between the temperature of the saturated liquid refrigerant 81 to be reduced, calculated by the monitoring electronics 8 from the measurement of the condensation pressure by the pressure gauge 22 and the discharge temperature of the refrigerant measured by the gauge 31.

The monitoring electronics 8 then controls the opening of the valve 62, in order to progressively increase the circulating mass of refrigerant in the circuit.

This causes the level of the purely liquid volume 302 at the bottom of the condenser 3 to increase, and concomitantly, restores the sub-cooling of the refrigerant by restoring the setpoint temperature difference between the calculated saturation temperature 81 and the discharge temperature of the condenser 3 measured by the gauge 31.

The elevation of the level of the liquid refrigerant in the volume 302 of the condenser 3 results in an increase in sub-cooling, because the increase of volume is associated with the increase of the exchange surface with the cooling fluid of the heat sink circuit 30, and therefore with an increase in thermal transfer.

The second operating situation is contrary to the first situation: the cooling power required by the source circuit 50 decreases.

This decrease is manifested by a temperature measured by the gauge 52 that is lower than in the previous time-step.

The cooling power provided by the system 1 is unchanged.

Consequently, the temperature measured by the gauge 53 in the source circuit 50 at the discharge of the evaporator 5 decreases, and concomitantly, the discharge temperature of the refrigerant from the evaporator 5 measured by the gauge 51 also decreases.

These two temperature parameters measured by the gauges 52, 53 are processed respectively by the electronics of the power controller 20 of the compressor 2, which reduces the flow rate of sucked refrigerant, and by the control electronics 40 of the expansion valve 4, which reduces the passage opening of the expansion valve 4.

The liquid flow rate at the intake of the expansion valve 4 is therefore reduced, which results in raising the level of the purely liquid volume 302 in the condenser 3, from there the difference is increased between the temperature of the saturating liquid 81, calculated by the monitoring electronics 8 based on the condensation pressure measured by the pressure gauge 22, and the discharge temperature of the refrigerant measured by the gauge 31.

The condensation pressure may also tend to increase, indicating that the purely liquid volume 302 is becoming relatively too large.

The monitoring electronics 8 then controls the opening of the valve 61, in order to progressively extract the refrigerant and reduce the circulating mass of refrigerant in the circuit.

This causes the decrease of the level of liquid 302 at the bottom of the condenser 3, and concomitantly restores the sub-cooling to its setpoint value, thus restoring the temperature difference between the calculated saturation temperature 81 and the discharge temperature of the liquid refrigerant from the condenser.

The method according to the invention has numerous advantages.

The method of controlling the circulating mass of refrigerant ensuring the required flow rate for the proper operation of the expansion valve 4 is advantageously based on the decoupling of two functions that are integrated into the thermostatic expansion valves, namely controlling the evaporation pressure and controlling the superheating of the refrigerant vapor, at the discharge of the evaporator 5.

The function of controlling the superheating is intended to prevent the arrival of liquid at the suction of the compressors 2, in order to preserve its integrity.

Advantageously, in the method of the invention the expansion valve 4 has the one and only function of controlling the evaporation pressure.

Advantageously, the superheat is controlled by the power variation of the compressor(s) 2.

According to one aspect of the invention, in the method, the control variable of the compression power is the discharge temperature of the medium cooled by the evaporator 5, and therefore indirectly the superheat temperature of the refrigerant.

This medium is a liquid, for example water, or a gas, such as air.

When this discharge temperature of the cooled medium becomes higher than the setpoint temperature, then the compression power is increased.

On the contrary, when this discharge temperature becomes lower than the setpoint temperature, the compression power is decreased.

Knowing the power consumed by the compression and knowing the characteristics of the compressor(s) 2, the refrigerant flow rate is known and is—or is not—in relation with the mass of fluid circulating in the circuit as a whole.

To provide the desired sub-cooling upstream from the expansion valve 4, which is at least 2° C. and which advantageously may be from 5° C. to 7° C., about 2% to 10% of the volume of the condenser 3 must be filled with liquid refrigerant, and as specified hereinafter, the liquid needs to fully occupy the connection volume that separates the condenser 3 from the intake of the expansion valve 4.

The condensation pressure depends on four parameters: the flow rate of refrigerant, the intake temperature of the cooling medium of the condenser 3, the flow rate of the cooling medium, the level of sub-cooled liquid at the bottom of the condenser 3.

The computerized monitoring of the refrigeration system according to the invention receives the measurement of the condensation pressure (measured by the gauge 22) and the measurements of the flow rate and intake temperature of the cooling medium that vary slowly with the intake temperature of the cooling medium and of the flow rate of this medium.

These parameters are considered by the monitoring system 8, in order to define the levels of condensation pressure to enable the other two parameters, which vary more quickly, to be followed with precision.

If the flow rate of refrigerant increases, the bottom of the condenser 3 is emptied of its liquid, the sub-cooling of the refrigerant decreases and the discharge temperature of the refrigerant approaches the saturation temperature 81, which is calculated by the computerized monitoring system 8.

This reduction in the difference between the discharge temperature and the saturation temperature 81 results in opening the fill valve 62 of the circuit coming from the receiver 6 installed in parallel with the liquid line 7, in order to increase the circulating mass and therefore the leveling of refrigerant at the bottom of the condenser 3, and thus the restoration of sub-cooling.

It should be noted that, concomitantly with the decrease in the sub-cooling associated with the increase in the flow of refrigerant, the expansion valve 4 is opened further to allow more flow to pass, but if it opens to the maximum the circulating mass of refrigerant tends to become insufficient, this second parameter completes or confirms the parameter of reduction of the sub-cooling.

Conversely, if the required cooling power decreases, the flow of refrigerant decreases, the circulating mass becomes too large, the condenser 3 is filled too much and the condensation pressure becomes too high, concomitantly with a significant increase in the sub-cooling and a reduction in the opening of the expansion valve 4.

The conditions are then satisfied for opening the valve 61 to discharge the circulating mass towards the receiver 6, until the sub-cooling setpoint value is obtained.

The method is implemented by the monitoring system 8 of the refrigeration system, which is advantageously a computerized program unit that in particular stores the thermodynamic table of the refrigerant, enabling the liquid saturation temperature 81 corresponding to the condensation pressure of the refrigerant charged in the refrigeration system to be calculated.

According to one aspect of the invention, a continuity of the liquid phase in the connection between the condenser 3 and the expansion valve 4 is provided, and the necessary adjustment of the circulating mass of refrigerant is provided based on variations in the flow rate of refrigerant.

Advantageously, a transfer to the receiver 6 is carried out if the circulating mass is too high, or conversely an extraction of refrigerant to the receiver 6 is carried out if the circulating mass is too low.

These arrangements ensure a nearly constant level of liquid at the bottom of the condenser 3, enabling a controlled sub-cooling advantageously between 2° C. and 7° C.

The implementation of the invention ensures the dynamic sub-cooling of refrigerants, i.e., by adapting the circulating mass of refrigerant to the variations in flow of the refrigerant in a vapor compression system.

Another advantage of the method of dynamic regulation of the circulating mass of refrigerant based on variations of flow of the refrigerant is that it also allows a quick diagnosis of a refrigerant leak.

In effect, a refrigerant leak will reduce the circulating mass of refrigerant.

The first effect will be the increase in temperature, measured by the temperature gauge 53, while the temperature measured by the gauge 52 remains constant.

The compressor 2 will accelerate, the control electronics 40 of the expansion valve 4 will open further the expansion valve opening, and the purely liquid volume 302 will decrease in the condenser 3.

The comprehensive monitoring will be able to diagnose that there is an increasing demand of the circulating mass of refrigerant, while the refrigeration demand of the source circuit 50 has not changed.

The demand for additional fluid will be granted by the monitoring electronics 8, but at the same time it will trigger an alert to search for a leak.

The invention claimed is:

1. A refrigeration system (1) comprising a compressor (2), a condenser (3), an expansion valve (4), an evaporator (5) and a receiver (6) of a refrigerant, the compressor (2) providing the circulation of a refrigerant, the condenser (3) being cooled by a cooling medium circulating in a heat sink circuit (30), the evaporator (5) cooling the medium of a source circuit (50), a liquid refrigerant line (7) connecting the condenser (3) to the expansion valve (4), the evaporator (5) being placed downstream from the expansion valve (4) and upstream from the compressor (2), the refrigeration system (1) providing a transfer of heat from the medium to be cooled circulating in the source circuit (50) from the evaporator (5) to the heat sink circuit (30) of the condenser (3), wherein the receiver (6) is installed in a line connected in parallel with the liquid refrigerant line (7) that directly connects the condenser (3) to the expansion valve (4), wherein the receiver is connected to the liquid refrigerant line by two conduits, a first conduit provided with a valve (61) enabling the discharge of the refrigerant to the receiver, and a second conduit provided with a valve (62) enabling the discharge of the refrigerant to the expansion valve, the refrigeration system comprising measurers connected to an electronic controller (8) that controls opening of the valve provided on the first conduit and the valve provided on the second conduit, wherein the opening of the valve provided on the first conduit enables the discharge of refrigerant to the receiver and the opening of the valve provided on the second conduit enables the discharge of the refrigerant to the expansion valve.

2. The refrigeration system (1) according to claim 1, wherein said measurers comprise a temperature gauge (52) in the source circuit (50) upstream from the evaporator (5), a temperature gauge (53) in the source circuit (50) downstream from the evaporator (5), a pressure gauge (41) in the refrigerant circuit connecting the expansion valve (4) and the evaporator (5), a pressure gauge (22) in the refrigerant circuit connecting the compressor (2) and the condenser (3), and a temperature gauge (31) in the heat sink circuit (30) downstream from the condenser (3).

3. The refrigeration system (1) according to claim 1, wherein said measurers comprise a temperature gauge (51) in the refrigerant circuit connecting the evaporator (5) and the compressor (2).

4. The refrigeration system (1) according to claim 1, wherein the refrigerant comprises ammonia, a hydrocarbon, or a fluorinated fluid or a mixture of refrigerants.

5. A method of operating a refrigeration system (1) as presented in claim 1, comprising maintaining a predefined sub-cooling of the refrigerant exiting from the condenser (3) by dynamic control of the circulating mass of refrigerant, by transferring refrigerant into or toward the receiver (6) installed in parallel with the liquid connection (7) between the condenser (3) and the expansion valve (4), as a function of the difference in temperatures between the condensation temperature of the saturating liquid (81) and the discharge temperature of the condenser (3).

6. The method according to claim 5, wherein the saturated condensation temperature (81) of the liquid is calculated by the electronic controller (8) of the refrigeration system which has in memory thermodynamic properties of the refrigerant charge in the refrigeration system (1).

7. The method according to claim 5, wherein the gaseous phase of the fluid contained in the receiver (6) is connected to the highest pressure of the refrigeration system (1), upstream from the condenser (3).

8. The method according to claim 5, comprising a diagnostic step of refrigerant leak from the refrigeration system (1), by comparing intake and discharge temperatures of the fluid cooled in the evaporator (5).

* * * * *